(12) United States Patent
Eicher et al.

(10) Patent No.: US 10,469,329 B1
(45) Date of Patent: Nov. 5, 2019

(54) COMPUTING SERVICE CAPACITY MANAGEMENT

(71) Applicant: Amazon Technologies, Inc., Reno, NV (US)

(72) Inventors: Anton André Eicher, Western Cape (ZA); Matthew James Eddey, Seattle, WA (US); Richard Alan Hamman, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 991 days.

(21) Appl. No.: 14/482,885

(22) Filed: Sep. 10, 2014

(51) Int. Cl.
*H04L 12/24* (2006.01)
*G06N 20/00* (2019.01)

(52) U.S. Cl.
CPC .............. *H04L 41/16* (2013.01); *G06N 20/00* (2019.01)

(58) Field of Classification Search
CPC ........................................................ H04L 41/16
See application file for complete search history.

(56) References Cited

U.S. PATENT DOCUMENTS

| | | | | |
|---|---|---|---|---|
| 7,774,391 | B1* | 8/2010 | Le ..................... | G06F 17/30091 707/822 |
| 9,426,036 | B1* | 8/2016 | Roy .................... | H04L 43/0882 |
| 2007/0067428 | A1* | 3/2007 | Ogawa ................. | H04L 47/821 709/223 |
| 2008/0022282 | A1* | 1/2008 | Cherkasova ........... | G06F 9/505 718/102 |
| 2010/0070449 | A1* | 3/2010 | Arnold ................. | G06N 5/02 706/48 |
| 2010/0269109 | A1* | 10/2010 | Cartales ............... | G06F 9/5072 718/1 |
| 2013/0055258 | A1* | 2/2013 | De ..................... | G06F 9/45533 718/1 |
| 2013/0212277 | A1* | 8/2013 | Bodik .................. | G06F 9/4887 709/226 |

(Continued)

OTHER PUBLICATIONS

Ardagna et al, SLA based resource allocation policies in autonomic environments, 2006.*

(Continued)

*Primary Examiner* — Li B. Zhen
*Assistant Examiner* — Mikayla Chubb
(74) *Attorney, Agent, or Firm* — Thorpe North & Western, LLP.

(57) ABSTRACT

A technology is described for managing computing capacity within a computing service environment. An example method may include determining a state of a computing service environment having a group of physical hosts that execute computing instances and determining a predicted demand for computing instance launches on the group of physical hosts. A co-location of the computing instance launches on the group of physical hosts may then be determined by applying the predicted demand for computing instance launches to the state of the computing service environment. A predicted launch time for the computing instance launches may then be determined using the co-location of the computing instance launches as an input feature. An additional physical host may then be added to the group of physical hosts to decrease the predicted launch time.

20 Claims, 8 Drawing Sheets

(56) References Cited

U.S. PATENT DOCUMENTS

| | | | |
|---|---|---|---|
| 2014/0068077 A1* | 3/2014 | Hadad | G06F 9/5027 709/226 |
| 2014/0189684 A1* | 7/2014 | Zaslavsky | G06F 9/45533 718/1 |
| 2014/0245319 A1* | 8/2014 | Fellows | G06F 8/45 718/104 |
| 2015/0113120 A1* | 4/2015 | Jacobson | G06N 5/04 709/224 |
| 2017/0228249 A1* | 8/2017 | Dow | G06F 9/45558 |

OTHER PUBLICATIONS

Bresnahan et al, Managing Applicance Launches in Infrastructure Clouds, 2011.*

Islam et al, Empirical prediction models for adaptive resource provisioning in the cloud, 2012.*

Silva et al, Heuristic for resources allocation on utility computing infrastructures, 2008.*

Wu et al, Modeling the Virtual Machine Launching Overhead under Fermicloud, May 26, 2014.*

Rochwerger et al, The RESERVOIR Model and architecture for open federated cloud computing (Year: 2009).*

* cited by examiner

COMPUTING SERVICE CAPACITY MANAGEMENT

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine (e.g., physical host) to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Launching one or more computing instances on a single physical computing machine may entail identifying available computing resources (e.g., physical hosts) on which a computing instance may be loaded and executed. A time to load and launch a computing instance on a single physical computing machine may vary due to various aspects of the computing environment containing the single physical computing machine and aspects of the computing instance being launched. As a result, a launch time for a computing instance may range from a few minutes to many minutes.

DETAILED DESCRIPTION

A technology is described for managing computing capacity within a computing service using a predicted launch time. In one example of the technology, computing capacity management may be performed by determining the state of a computing service environment providing customers with network accessible computing instances (e.g., identifying the status of physical hosts within the computing service environment executing computing instances), predicting customer demand for computing instances launches, and determining an expected co-location of computing instance launches on individual physical hosts by applying the predicted customer demand to a model representing the state of the computing service environment. As referred to in this disclosure, a computing instance may be a virtual machine (e.g., an instance of a software implementation of a computer) that executes applications like a physical machine. A physical host may be a server that hosts a plurality of computing instances and a computing service may be a network accessible service providing customers with network accessible computing instances.

Data for a launch feature representing the expected co-location of computing instance launches may be provided to a machine learning model configured to generate a predicted launch time for computing instance launches, based in part on the computing capacity available in the computing service environment. The predicted launch times may be used to determine an amount of computing capacity to add to the computing service environment to increase actual launch times.

In one example, the predicted launch time may be compared to a target launch time to determine whether the predicted launch time satisfies the target launch time. In a case where the predicted launch time does not satisfy the target launch time, additional physical hosts may be identified and added to the computing service, making additional computing capacity available to host computing instances. Adding additional computing capacity to the computing service environment may result in launch times that satisfy the target launch time.

A launch time for a computing instance may be influenced when two or more computing instance launches are co-located (i.e., executed simultaneously) on a single physical host. In particular, launching multiple computing instances on a single physical host may increase launch times for the computing instances beyond a target launch time. As a result of this technology, predicted launch times based in part on current available computing capacity may be obtained and the predicted launch times may be used to determine a number of physical hosts to add to the computing service environment resulting in target launch times being satisfied.

Figure 1:
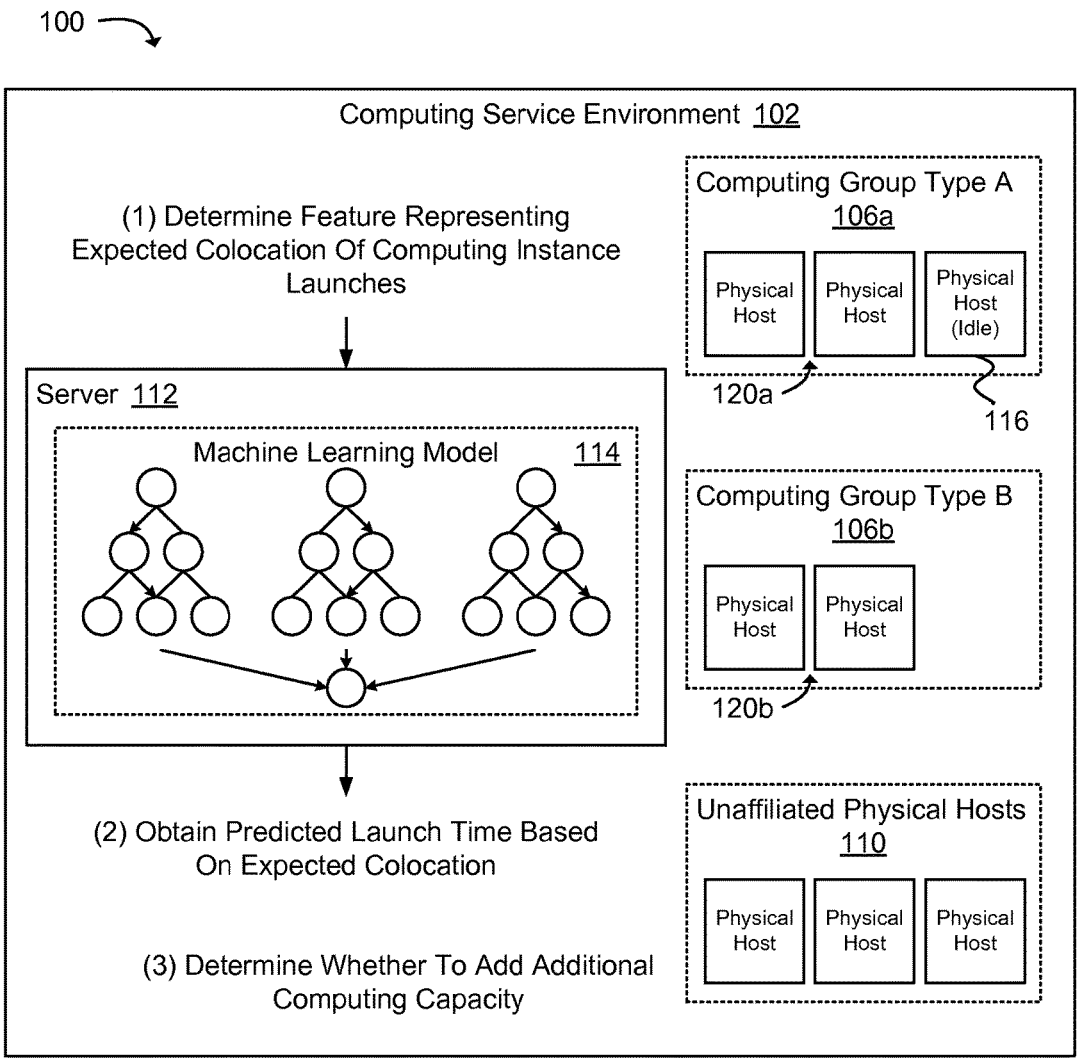
FIG. 1 is a block diagram illustrating an example system and method for managing computing capacity within a computing service environment using predicted launch times.

FIG. 1 is a diagram illustrating a high level example of a system 100 that may be used to manage computing capacity within a computing service environment 102. In one example, predicted launch times for computing instance launches may be obtained and a determination may be made, based in part on the predicted launch times, whether sufficient computing capacity exists to achieve a desired launch time. The system 100 may include a computing service environment 102 having a server 112 configured to execute a machine learning model 114 providing predicted launch times for launch plans for computing instances. Also included in the computing service environment 102 may be a number of computing groups 106*a-b* that include a plurality of physical hosts 120*a-b* configured to execute computing instances of a particular computing instance type. The computing service environment may further include a number of unaffiliated physical hosts 110 available for use within a computing group 106*a-b* (e.g., physical hosts that may not be affiliated with a particular computing group).

Illustratively, a computing instance type may refer to a class of computing instances configured with varying combinations of processors, memory, storage, and/or networking capacity. For example, some computing instances may be configured for general purpose computing, performance optimized computing, memory optimized computing, GPU (Graphical Processor Unit) computing or I/O (Input and Output) intensive computing. Physical hosts may be configured to host computing instances of a particular computing instance type. As a specific example, a physical host may be configured (i.e., hardware and/or software) to host high performance computing instances by installing appropriate software (e.g., a specially configured hypervisor) on a physical machine having sufficient processing hardware to execute the high performance computing instances.

The computing capacity of a computing service environment 102 may be categorized into groups of physical hosts configured to execute computing instance types. As an example, a first computing group 106a may include physical hosts 120a configured to execute general purpose computing instances and a second computing group 106b may include physical hosts 120b configured to execute memory optimized computing instances. In a case where computing capacity may need to be added to a computing group 106a-b (e.g., to satisfy target launch times or SLA (Service Level Agreement) launch times), one or more physical hosts may be added to the computing group 106a-b.

A physical host added to a computing group 106a-b may be an available (e.g., idle) physical host 116 included in a first computing group 106a or may be an unaffiliated physical host 110 that may not be associated with a computing group 106a-b. A physical host added to a computing group 106a-b may be reconfigured to execute a computing instance type associated with the computing group 106a-b. For example, a physical host 120a-b or 110 may be reconfigured by reformatting the physical host and installing a hypervisor configured for the computing instance type associated with the computing group 106a-b.

In one example configuration, a computing service provider may manage available computing capacity by determining expected co-located computing instance launches (i.e., simultaneous launches of two or more computing instances on a single physical host 120a-b) that may occur within the computing service environment 102. A co-location feature (1) representing expected co-located computing instance launches may be provided as input to a machine learning model 114 that generates a predicted launch time based in part on the expected number of co-located computing instance launches and using additional features of the computing instance, physical hosts 106a-b or overall computing service environment 102. In one example, expected co-located computing instance launches may be determined by identifying a state of the computing service environment 102, predicting customer demand for computing instance launches and applying the predicted customer demand for computing instance launches to the state of the computing service environment 102.

Illustratively, the state of the computing service environment 102 may be obtained by querying, for example, a computing service manager for information that includes the identity of computing groups 106a-b, a number of physical hosts 120a-b included in a computing group 106a-b, a load capacity of the physical hosts 120a-b (e.g., a number of pending launches on a physical host 120a-b and a number of running computing instances on the physical host 120a-b) and a number of idle physical hosts 120a-b that may be included in a computing group 120a-b.

Customer demand for launching computing instances within the computing service environment 102 may be calculated using historical data representing computing instance launch patterns or may be determined using launch demand heuristics. In one example, computing instance launch patterns may be identified using historical data, providing a computing service provider with an idea of when, where and how many launch requests may be made during a particular time period (e.g., historical data may show that some customers, on average, submit a large number of computing instance launch requests after 5 pm). In another example, customer demand for computing instance launches may be determined using a launch demand heuristic (e.g., ensuring the ability to support 1,000 launch requests of a specific computing instance type after 5 pm).

For instance, applying the predicted customer demand for computing instance launches to the state of the computing service environment 102 may include modeling the computing service environment and simulating launches of a number of computing instances equal to the predicted customer demand. As a result of the modeling, a determination may be made of the number of computing instance launches that may be co-located on a physical host 120a-b. More specifically, a metric representing computing instance launches that may be co-located on individual physical hosts 120a-b due to insufficient computing capacity (i.e., physical hosts 120a-b) within a computing group 106a-b may be estimated.

The expected co-location of computing instance launches may be included as one launch feature provided to a machine learning model 114 to obtain a predicted launch time for a computing instance launch plan or for a computing instance launched in a particular computing group 106a-b. The machine learning model 114 may generate the predicted launch time using data for the launch features and output a predicted launch time used to (3) determine whether to add additional computing capacity. Illustratively, a predicted launch time may be the time between receiving a launch request (e.g., a computing instance state is "pending") and the start of computing instance boot (e.g., the computing instance state is "running"). The predicted launch time may be used in analysis to improve computing instance launch times. Namely, the predicted launch time may be a factor in determining whether additional physical hosts 120a-b may be added to a computing group 106a-b.

As an illustration, a predicted launch time for a computing instance having a computing instance type may be compared to a target launch time associated with the computing instance type. In a case where the predicted launch time may be greater than the target launch time, a determination may be made that one or more physical hosts 120a-b may be added to the computing group 106a-b executing the computing instance type for the purpose of increasing launch times of computing instances within the computing group 106a-b.

In one example configuration, a determination of a number of physical hosts 120a-b to add to a computing group 106a-b may be made by providing a launch feature representing added computing capacity, along with other launch features to the machine learning model 114. The launch feature representing added computing capacity may represent a number of physical hosts 120a-b added to a computing group 106a-b. A resulting predicted launch time may then be compared to a target launch time to determine whether the value of the launch feature resulted in an improved predicted launch time that satisfies the target launch time.

The launch feature representing the added computing capacity may be variable, such that a number of physical hosts 120a-b added to the computing group 106a-b represented by the launch feature may be modified, while other launch feature values provided to the machine learning model 114 may be held constant. For example, the value of the launch feature for the added computing capacity may be increased and the values of other launch features may be held constant. The process of increasing the value of the launch feature and obtaining a predicted launch time may be repeated until a predicted launch time may be obtained that may be less than a target launch time.

In another example configuration, when identifying a physical host(s) 116 included in a first computing group 106a that may be available to add to a second computing group 106b, the process described above of modifying a launch feature representing added computing capacity may be used to determine a number of physical hosts 120a that may be removed from the first computing group 106a without negatively affecting a launch time of computing instances within the first computing group 106a. As an illustration, a launch feature representing a number of physical hosts 116 removed from the first computing group 106a may be provided to the machine learning model 114 to obtain a predicted launch time. The predicted launch time may then be analyzed to determine an effect of the removal of the physical hosts 116 from the first computing group on the predicted launch time.

Figure 2:
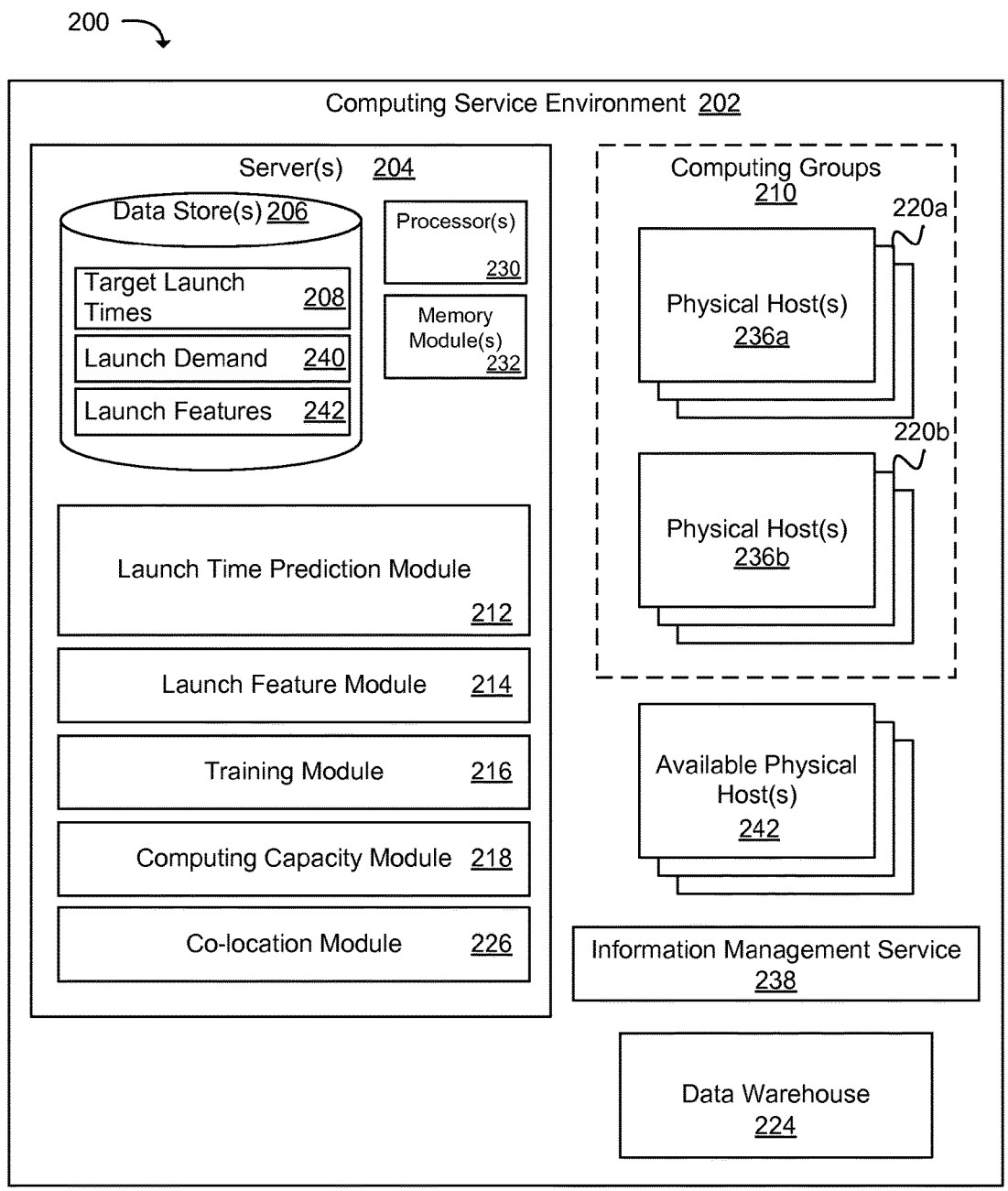
FIG. 2 is a block diagram that illustrates various example components included in a system for managing computing capacity using predicted launch times in a computing service environment.

FIG. 2 illustrates components of an example system 200 on which the present technology may be executed. The system 200 may include a computing service environment 202 that may provide customers with network accessible services, such as computing instances that execute on physical hosts 236a-b. Included in the computing service environment 202 may be a server 204 that hosts a launch time prediction module 212 that may be used to generate predicted launch times for computing instances launched on the physical hosts 236a-b. In addition to the launch time prediction module 212, the server 204 may contain a launch feature module 214, a training module 216, a computing capacity module 218, a co-location module 226 and one or more data stores 206 having data that may be accessible to the modules contained on the server 204.

The computing capacity module 218 may be configured to manage computing capacity within the computing service environment 202. More specifically, computing capacity may be managed within computing groups 210 containing physical hosts 236a-b configured to execute computing instances of a particular computing instance type. In one example configuration, computing capacity may be managed by maintaining a number of physical hosts 236a-b within a computing group 210 that results in a minimum number of co-located computing instance launches on the physical hosts 236a-b. For example, increasing a number of physical hosts 236a-b within a computing group 210 may result in a reduced predicted launch time due to a greater number of physical hosts 236a-b that may be available to host computing instances and may reduce a likelihood of co-location of computing instance launches on any one of the physical hosts 236a-b.

Co-location of computing instance launches on physical hosts 236a-b may significantly influence launch times for computing instance launches. Therefore, launch times may be improved within a computing group 210 when additional physical hosts 236a-b are added to the computing group 210. In one example, a threshold predicted launch time may be used as a benchmark to determine whether physical hosts 236a-b added to a computing group 210 resulted in an improved predicted launch time. Examples of a threshold predicted launch time may include a target launch time, an SLA launch time, an average launch time, a maximum launch time or any other launch time as determined by a computing service provider.

Due to constraints on computing resource (i.e., available physical hosts 242) and/or a desire to distribute available computing resources among various computing groups 210, adding an unlimited number of physical hosts 236a-b to a computing group 210 may not be practicable. Therefore, in order to determine how many physical hosts 236a-b may be added to a computing group 210 to reduce co-located computing instance launches, the computing capacity module 218 may be configured to determine a number of physical hosts 236a-b to add to a computing group 210 based in part on a predicted launch time for a computing instance launch in the computing group 210.

In one example, the computing capacity module 218 may be configured to obtain from a co-location module 226 an expected co-location. The co-location module 226 may be used to calculate expected co-location of computing instances on physical hosts 236a-b by modeling a state of the computing service environment 202 and applying a predicted demand for computing instance launches to the computing service environment model. The state of the computing service environment 202 may be obtained by querying various computing service components for information related to the computing service environment state. For example, a state of the computing service environment 202 may include a status of physical hosts 236a-b included in the computing service environment 202 where the status may include, but is not limited to, metrics associated with pending computing instances and/or running computing instances on particular physical hosts 236a-b. In one example, an information management service 238 may be queried to obtain information regarding the state of the computing service environment 202.

The predicted launch demand may then be obtained from a data store 206 containing launch demand 240 (e.g., customer launch demand) for computing instances of a particular computing instance type. The launch demand 240 may be based on a heuristic (e.g., a metric representing a number of launch requests that a computing service provider would like to support), or may be based on computing instance launch patterns. In an example where computing instance launch patterns may be used to predict launch demand, historical launch data may be evaluated to determine computing instance launch patterns, which may be stored as launch demand 240 in the data store 206.

The co-location module 226 may be configured to then apply the launch demand 240 to a model representing the state of the computing service environment 202 (e.g., to simulate computing instance launches within the computing service environment 202). Analysis may be performed to determine expected occurrences of co-located computing instance launches within the various computing groups 210. According to the analysis, expected co-location (i.e., expected occurrences of simultaneous computing instance launches on a physical host 236a-b) may be determined and the expected co-location may then be returned to the computing capacity module 218.

Having obtained the expected co-location, the computing capacity module 218 may then make a request to the launch time prediction module 212 for predicted launch times, which may be used to determine computing capacity for the computing service environment 202 as described in greater detail below. In one example configuration, the launch time prediction module 212 may be configured to generate predicted launch times for computing instances placed on physical hosts 236a-b located within the computing service environment 202. For example, as illustrated in FIG. 2, the launch time prediction module 212 may be executed within the computing service environment 202 and may provide predicted launch times for computing instances launched in the computing service 202. In another example configuration, the launch time prediction module 212 may be external to any computing services and may receive requests for predicted launch times from any number of computing services by way of a network.

Examples of machine learning models that may be used to predict a launch time may include regression models, such as a random forest model, extremely randomized trees model, an AdaBoost model, a stochastic gradient descent model, a support vector machine model, as well as other types of machine learning models not specifically mentioned here.

A training module 216 may be configured to obtain features from various data sources that are then used to train the launch time prediction module 212. In one example, feature data may be retrieved from a data warehouse 224. The feature data may be launch metrics from previous computing instance launches within the computing service environment 202 that have been stored to the data warehouse 224. Illustratively, an information management service 238 may push (e.g., upload) launch related data to the data warehouse 224 making the data accessible to the training module 216. Data retrieved from the data warehouse 224 may be recent data (e.g., seconds, minutes or hours old) or historical data (e.g., days, weeks or months old) associated with computing instance launches.

Feature data retrieved from the data warehouse 224 may align with launch features 208 of a launch configuration determined to have an impact on a launch time of a computing instance. For example, the launch feature module 214 may be configured to perform analysis that determines which launch features 208 of a launch configuration impact a launch time and a query may then be constructed that selects feature data for the launch features 208 from the data warehouse 224. In some examples, feature data for the launch features 208 may be processed into a reduced representation set of launch features (e.g., features vector) when the feature data may be large or redundant. Having obtained the launch features 208, the launch time prediction module 212 may then be trained using the launch features 208.

The launch time prediction module 212 may be initially trained using historical data and then placed in production where the launch time prediction module 212 may provide a predicted launch time according to an on demand basis. The training module 216 may be configured to obtain historical data for launch features 208 from a data warehouse 224 and provide the historical data to the launch time prediction module 212 to initially train the launch time prediction module 212. Subsequent training of the launch time prediction module 212 may be performed by removing the launch time prediction module 212 from production (e.g., offline) and training the launch time prediction module 212 using historical data (e.g., data from the previous day, week, month, etc.). Alternatively, subsequent training may be performed while the launch time prediction module 212 is in production (e.g., online) using recent data (e.g., data from the previous minutes, hours, day, etc.).

The launch time prediction module 212 may generate a predicted launch time via an algorithm that determines a predicted launch time by evaluating the launch feature data provided to the machine learning model. As one example, the launch time prediction module 212 may comprise a number of decision trees where launch feature data may be input into the decision trees, and using regression, a predicted launch time may be calculated using the output of the decision trees. The predicted launch time generated by the launch time prediction module 212 may then be provided to a process or module requesting the predicted launch time.

Upon receiving a request for a predicted launch time that includes an expected co-location that may be used as one launch feature to generate a predicted launch time, the launch time prediction module 212 may obtain additional launch features for a computing instance launch (e.g., in addition to the expected co-location launch feature). The launch features may then be provided to a machine learning algorithm. For example, a launch feature module 214 may be configured to identify the launch features 208 for a launch request or a launch plan and provide data for the launch features 208 to the launch time prediction module 212 as part of a predicted launch time request.

Illustratively, launch features 242 may be obtained from a data store 206 and may be used to identify specifications in a launch configuration for a computing instance launch that align with the launch features 208. Data for the launch features 208 may then be identified and obtained from the launch configuration and from other data sources, such as an information management service 238. The launch features 208 may then be provided to the machine learning algorithm and a resulting predicted launch time may be returned to the computing capacity module 218.

A predicted launch time may be returned to the computing capacity module 218, which may be further configured to use the predicted launch time to determine whether to add one or more physical hosts 236a-b to a computing group 210. For example, the predicted launch time may be compared to a target launch time, and if the predicted launch time is greater than the target launch time, then an available physical host 242 may be added to the computing group 210. In a case where a physical host 242 may not be available, the various computing groups 210 may be analyzed to identify a physical host 236a-b included in a first computing group 220a that may be available to reconfigure and add to a second computing group 220b. For example, a physical host 236a having hardware (e.g., processors and memory) capable of executing a computing instance type included in a second computing group 220b may be reconfigured to host computing instances of the computing instance type and the physical host 236a may then be included in the second computing group 220b.

A physical host 236a-b included in the system 200 may be a server computer configured to execute an instance manager (i.e., a hypervisor, virtual machine monitor (VMM), or another type of program) that manages multiple computing instances on a single physical host 236a-b. The physical hosts 236a-b may be located in data centers within various geographical regions. As a result, launch times for computing instances may be influenced based on the geographical region of a physical host 236a-b selected to host a computing instance. Also, a launch time may be influenced by other attributes of a physical host 236a-b, such as architecture, brand, etc.

The various processes and/or other functionality contained within the system 200 may be executed on one or more processors 230 that are in communication with one or more memory modules 232. The system 200 may include a number of computing devices (e.g., physical hosts 236a-b and servers 204) that are arranged, for example, in one or more server banks or computer banks or other arrangements.

The computing devices may support a computing environment using hypervisors, virtual machine monitors (VMMs) and other virtualization software. For example, the server 204 executing the launch time prediction module 212 may be implemented as a computing instance hosted on a physical host 236a-b.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 206 may include storage systems such as a SAN (Storage Area Network), cloud storage network, volatile or non-volatile RAM, optical media, or hard-drive type media. The data store 206 may be representative of a plurality of data stores as can be appreciated.

A network (not shown) used facilitate communication between the components of the system 200 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
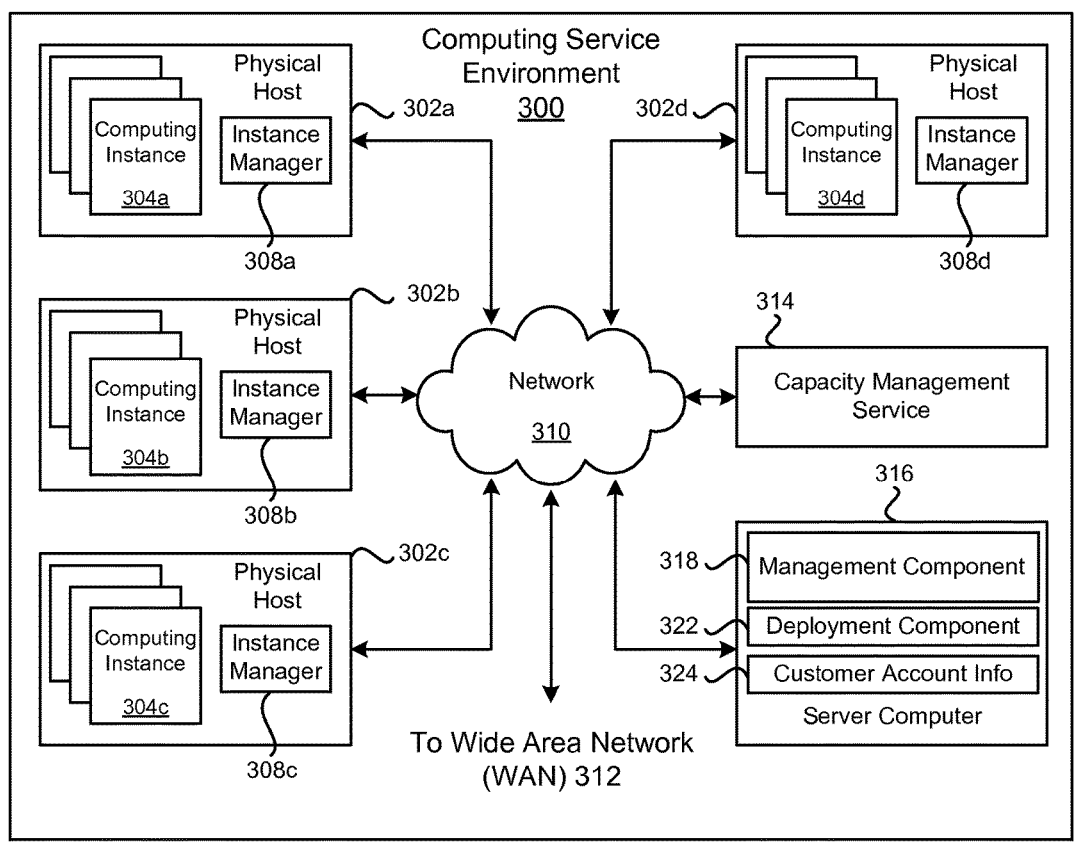
FIG. 3 is a block diagram that illustrates an example computing service environment that includes a capacity management service using predicted launch times.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of physical hosts 302a-d. While four physical hosts are shown, any number may be used, and large data centers may include thousands of physical hosts 302a-d. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the physical hosts 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single physical host. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a capacity management service that may manage a number of physical hosts 302a-d included in the computing service environment 300 as described earlier.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300, the physical hosts 302a-d and the server computers 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
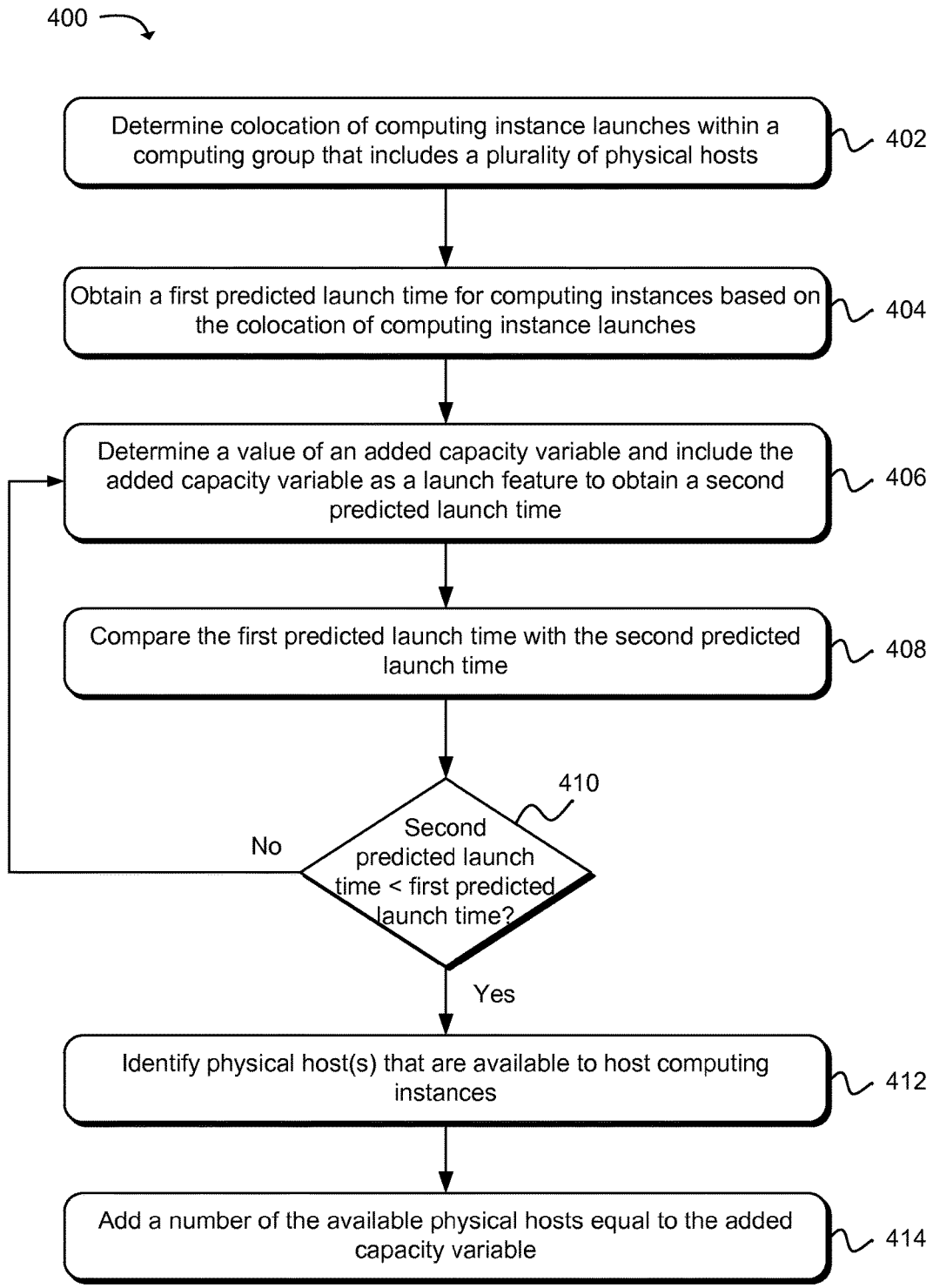
FIG. 4 is a flow diagram illustrating an example method for managing computing capacity within a computing service environment using predicted launch times.

Moving now to FIG. 4, a flow diagram illustrates one example method 400 for managing computing capacity within a computing service environment. Beginning in block 402, co-location of computing instance launches within a computing group that includes a number of physical hosts may be determined. The physical hosts included in the computing group may be host computing instances of a specific computing instance type (e.g., micro, small medium, large, etc. and general purpose, memory intensive, etc.). Co-location of computing instance launches may be expected co-location, planned co-location or a co-location probability. The co-location of computing instance launches may be determined by modeling the state of the computing service environment and then applying a launch demand (i.e., a predicted number of computing instance launches) to the model.

As in block 404, a first predicted launch time for computing instances based on the co-location of computing instance launches may be obtained. The co-location may be at least one launch feature included in a set of launch features provided to a machine learning model that generates a predicted launch time. As in block 406, a second predicted launch time may be obtained. In obtaining the second predicted launch time, a value of an added capacity variable may be determined. The value of the added capacity variable may represent a number of physical hosts that may be added to the computing group to reduce co-located launches within the computing group. For example, the value of the add capacity variable may be set to a numeric value 1, 2, 5, 20 or 100 representing 1, 2, 5, 20 or 100 additional physical hosts added to the computing group.

After determining the value of the added capacity variable, the value may be used as one launch feature (e.g., an added capacity feature) provided to the machine learning model to obtain a second predicted launch time. The value of the added capacity variable may be included with other launch features used to generate the first predicted launch time. For example, the launch features and associated values used to generate the first predicted launch time may be used to generate the second predicted launch time with the further inclusion of the added capacity variable value. In obtaining the second launch time, the values of the launch features or launch plan features may be held constant (i.e., retain the same values used in generating the first predicted launch time), with the exception of the added capacity variable value, which was not included in obtaining the first predicted launch time.

As in block 408, the first predicted launch time may then be compared to the second predicted launch time to determine whether adding a number of physical hosts equal to the value of the added capacity variable resulted in an improved predicted launch time. As in block 410, in a case where the second predicted launch time may not be less than the first predicted launch time, then the added physical hosts represented by the added capacity variable did not result in an improved predicted launch time. In such a case, the value of the added capacity variable may be modified (e.g., increased), and another predicted launch time may be obtained and compared with the first predicted launch time. For example, the process of modifying the value of the added capacity variable may be performed iteratively until a predicted launch time is obtained that is less than the first predicted launch time.

In a case where the second predicted launch time may be less than the first predicted launch time, then as in block 412, one or more physical hosts available to host computing instances of the computing instance type may be identified. As described earlier, a physical host may be identified from an available pool of physical hosts, or may be a physical host included in another computing group. When identifying physical hosts included in other computing groups, the computing groups may be analyzed to determine available computing capacity for launching computing instances of computing instance types within the computing groups. In other words, a determination may be made whether a computing group contains a sufficient number of physical hosts to accommodate computing instance launches within a certain launch time after one or more physical hosts included in the computing group are reassigned.

After identifying one or more physical hosts, as in block 414, a number of the physical hosts equal to the value of the added capacity variable may be added to the computing group. As an illustration, where the value of the added capacity variable may be 2, 10, 50, etc. then that number of additional physical hosts may be added to the computing group. In some cases, the added physical hosts may be reconfigured to host computing instances of the computing instance type included in the computing group that the physical hosts are being assigned to.

Figure 5:
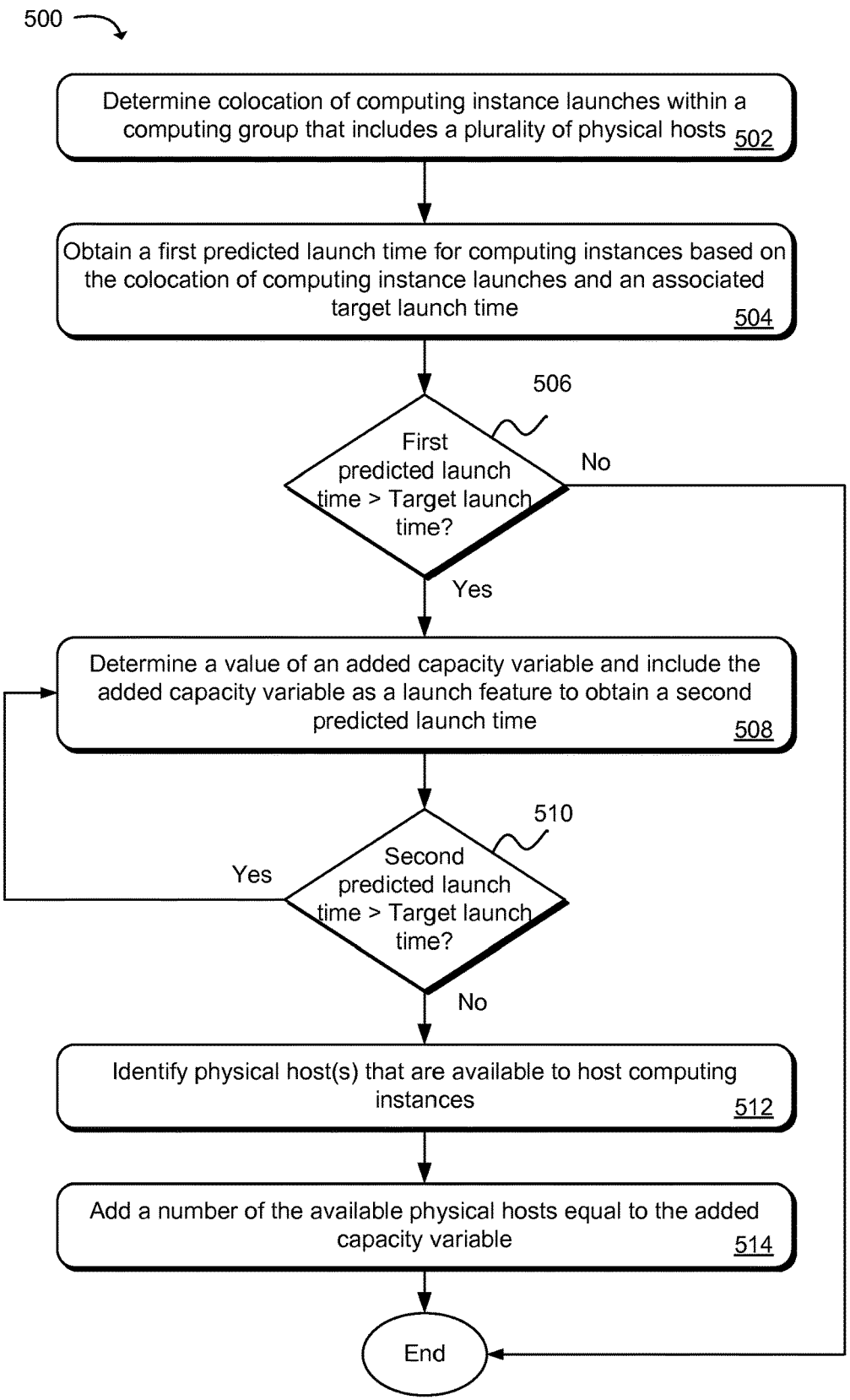
FIG. 5 is a flow diagram that illustrates an example method for managing computing capacity within a computing service environment based in part on a target launch time and using predicted launch times.

FIG. 5 is a diagram that illustrates another example of a method 500 for managing computing capacity within a computing service environment. The method 500 may be used to actively manage available computing capacity within the computing service environment, as well as to perform capacity management analysis for long term computing capacity planning. Starting in block 502, a determination of co-located computing instance launches within a computing service environment and/or a computing group may be made as described earlier. As in block 504, a first predicted launch time may then be obtained by providing a launch feature representing the co-location of computing instance launches to a machine learning model that generates the first predicted launch time.

Also, along with the first predicted launch time a target launch time may be obtained (e.g., from a data store). The target launch time may be associated with computing instance launches that may be requested by a customer. More specifically, the target launch time may be a launch time for a computing instance of a particular computing instance type. For example, a computing service provider may provide a customer with an SLA launch time stating that computing instances of a specific type (e.g., micro, small medium, large, etc. and general purpose, memory intensive, etc.) may finish the launch process within a stated time period (e.g., a number of minutes).

The first predicted launch time and the target launch time may be compared to determine whether the first predicted launch time may be greater than the target launch time, as in block 506. In a case where the first predicted launch time may not be greater than the target launch time, then no further analysis may be need.

In a case where the first predicted launch time may be greater than the target launch time, then as in block 508, a value of an added capacity variable may be determined and the value may be included as a launch feature used to obtain a second predicted launch time. The value of the added capacity variable may be initially set as a low value and submitted to the machine learning model along with the other launch features used to obtain the first predicted launch time. In the event that additional launch times are obtained from the machine learning model, the value of the added capacity variable may be incrementally increased until a predicted launch time may be obtained that is less than the target launch time.

After obtaining the second predicted launch time, the second predicted launch time may be compared with the target launch time. As in block 510, in a case where the second predicted launch time may be greater than the target launch time, the value of the added capacity variable may be modified (e.g., increased) and a third predicted launch time may be obtained from the machine learning model using a launch feature representing the value of the added capacity variable. The process of incrementing the added capacity variable and obtaining predicted launch times may be iteratively performed until a predicted launch time may be obtained that is less than the target launch time.

In a case where the second predicted launch time may be less than the target launch time, than as in block 512, physical hosts available to host computing instances of the type included in the computing group may be identified. The physical hosts may be idle physical hosts configured to host computing instances of the computing instance type, or idle physical hosts that may be included in another computing group that can be reconfigured to host computing instances of the computing instance type. Also, in the case of medium term and long term computing capacity planning, identifying physical host may include building new computing hardware (servers) or purchasing additional servers.

As in block 514, a number of physical hosts equal to the added capacity variable that have been identified as available may be added to the computing group. For example, available physical hosts or an acquisition of physical host hardware equal to the added capacity variable may be obtained and added to the computing group.

Figure 6:
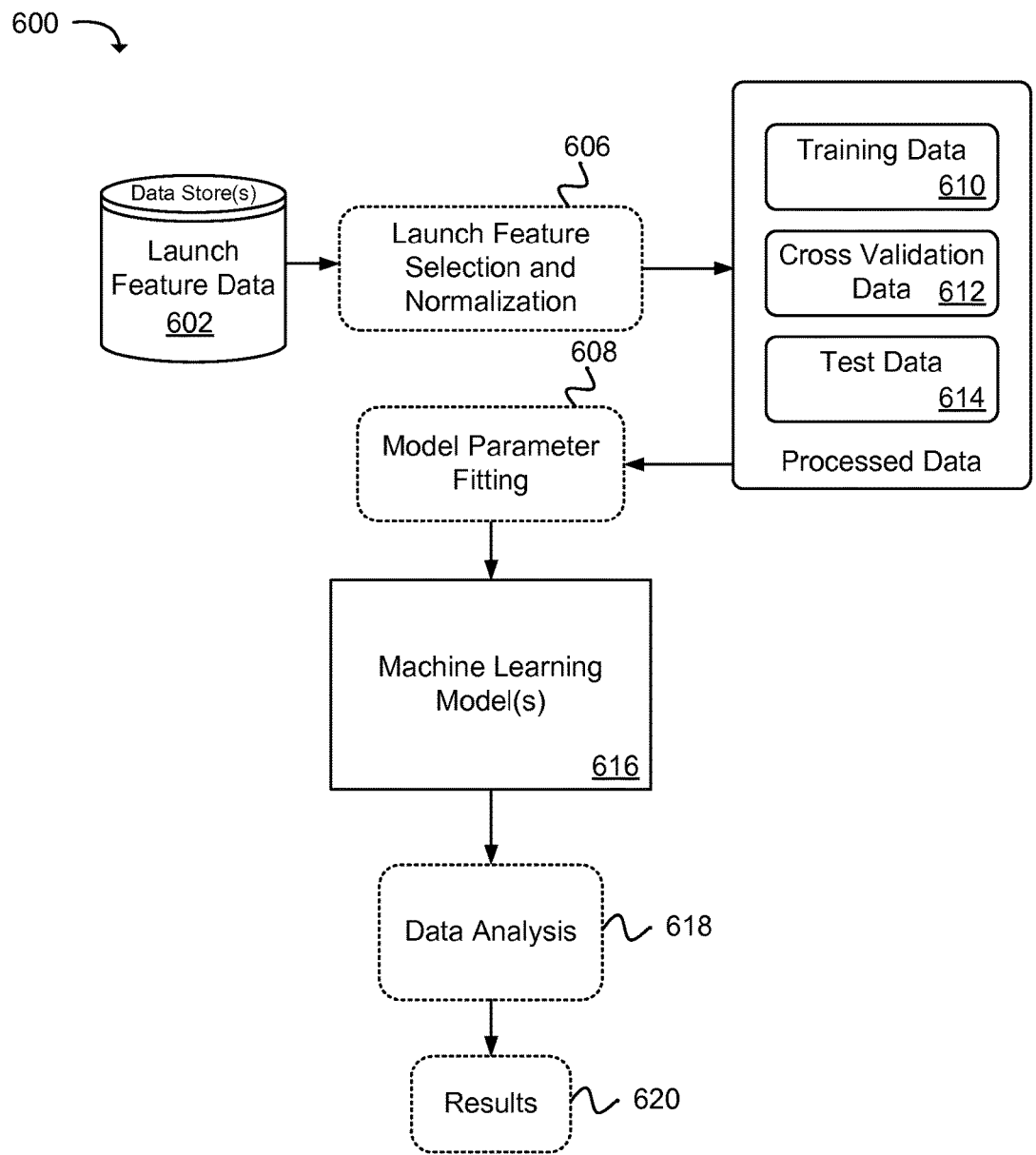
FIG. 6 is a diagram illustrating an example method for configuring and training a machine learning model used to generate a predicted launch time.

FIG. 6 is a flow diagram illustrating one example of a method 600 for configuring and training a machine learning model 616 used to generate a predicted launch time. As in block 606, launch feature selection may be performed by analyzing various computing instance launches to determine launch features that have an impact on a computing instance launch time. For example, various features of launching a computing instance on a physical host within a computing service environment, where the features are capable of being observed, may be identified.

Examples of launch features may include, but are not limited to: a number of contending computing instances on a physical host, a number of running computing instances on a physical host, a count of running computing instances on a physical host at the start and the end of the computing instance launch, a machine image used to create a computing instance, a kernel image used by a computing instance, an architecture of a physical host, a virtualization type of a computing instance, a maximum number of computing instances that a physical host is capable of hosting, a percentage of occupancy of a physical host by computing instances at a start of a computing instance launch, a geographical region where a physical host is located, a hardware type of a physical host, a hardware vendor of a physical host, and an operating system, networking type, data store and size of a computing instance.

Launch features determined to have an impact on a launch time of a computing instance may be categorized. For example, categories of launch features may be based on various aspects of a computing instance launch. As an illustration, launch features may be categorized into machine image launch features, physical host launch features and customer configuration launch features.

In one example, identified launch features may be sorted or ranked according to an impact of a launch feature on a computing instance launch time and those launch features having the greatest impact on launch time may be selected. For example, launch features may be analyzed to determine a percentage of contribution that an individual launch feature has on a launch time. Launch features identified as having the greatest contribution on a launch time may be selected as input to a machine learning model. It should be noted that any number of launch features may be selected and the selection of the launch features may not be limited to just those launch features having the greatest impact on a launch time.

Having identified the launch features, launch feature data 602 for the launch features may then be obtained from data sources containing data associated with the launch features. As illustrated, launch feature data 602 may be obtained from a data store containing, for example, computing service management data, inventory service data (e.g., physical host information), as well as other data associated with a computing service. The launch feature data 602 may be normalized enabling launch feature data 602 obtained from different data sources to be input into the machine learning model 616. The launch feature data 602 may be divided into training data 610, cross validation data 612 and test data 614. For example, a percentage of the launch feature data 602 may be randomly selected as test data 614 and cross validation data 612, and the remaining launch feature data 602 may be used as training data 610 to train the machine learning model 616.

The machine learning model 616 may be selected from among any available machine learning algorithm. In one example, a number of regression machine learning models may be tested to determine a machine learning model that provides an acceptable approximation of a launch time. One aspect of testing machine learning models may be, as in block 608, performing a parameter value search for machine learning parameters that result in a goodness-of-fit of the machine learning model 616 to the launch features. Machine learning parameters (i.e., parameters used to configure a machine learning model 616, such as setting a depth of a decision tree) may affect how a machine learning model 616 fits the training data 610. In one example, a distributed genetic algorithm may be used when a parameter space of a machine learning model 616 may be too large to perform a thorough parameter value search.

After selecting a machine learning model 616, the machine learning model 616 may be trained using the training data 610. The cross validation data 612 and the test data 614 may then be run through the machine learning model 616. Thereafter, as in block 618, data analysis may be performed to determine how well the machine learning model 616 was able to predict a launch time compared to an actual launch time. After testing two or more machine learning models 616, as in block 620, the results of the machine learning models 616 may be compared to identify the better performing machine learning model 616, which may then be selected and placed in a production environment.

Figure 7:
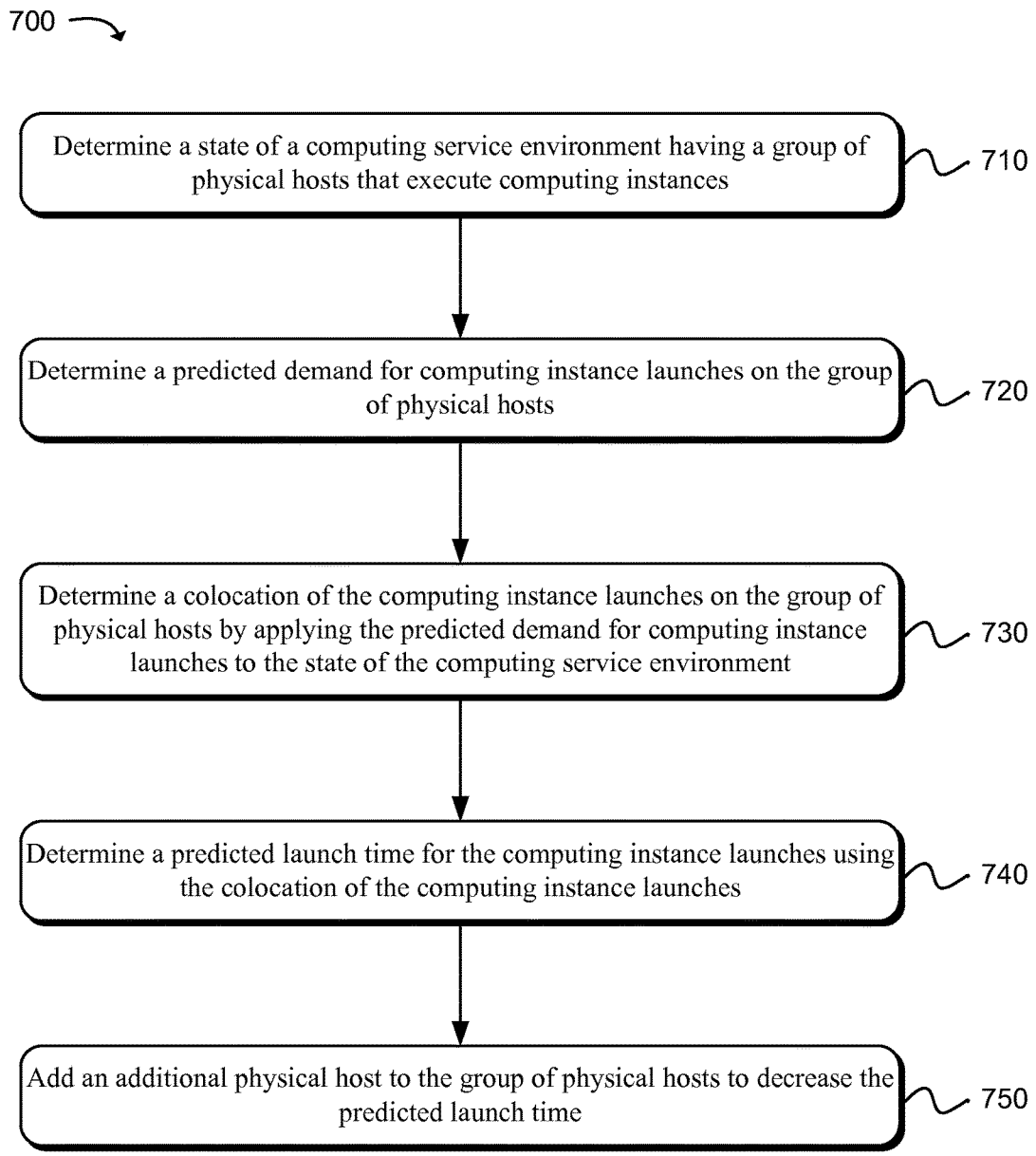
FIG. 7 is a flow diagram that illustrates an example method for determining computing capacity for a computing service using predicted launch times.

FIG. 7 is a flow diagram illustrating an example method 700 for determining computing capacity for a computing service. Beginning in block 710, a state of a computing service environment having a group of physical hosts executing computing instances may be determined. The state of the computing service environment may include physical host status information that includes metrics associated with pending computing instances and running computing instances on the physical hosts, as well as other information related to the computing service environment. The physical hosts included in the physical host groups, in one example, may be configured to host computing instances of a particular computing instance type.

As in block 720, a predicted demand for computing instance launches on the group of physical hosts may be determined. The predicted demand may be an estimation of a number of computing instance launches that may be requested during a certain time period. Predicted demand may be determined using historical data that represents computing instance launch patterns, or may be launch demand heuristics for a group of physical hosts.

After determining the state of the computing service environment and the predicted demand, as in block 730, a co-location of the computing instance launches on the group of physical hosts may be determined by applying the predicted demand for computing instance launches to the state of the computing service environment. For example, the state of the computing service environment may be modeled, such that computing instance launch simulations may be performed using the model. Based on the launch simulations, an expected number of co-located computing instance launches may be determined. Namely, a number of parallel computing instance launches on single physical hosts may be identified.

As in block 740, a predicted launch time for the computing instance launches may be determined using the co-location of the computing instance launches. For example, one launch feature used by a machine learning model to generate a predicted launch time may be a launch feature representing the co-location of the computing instance launches. The predicted launch time may be a time in which a computing instance is in a state of pending (i.e., executing service calls to setup computing instance resources, identifying a physical host to host the computing instance and creating the computing instance on the physical host) to a time in which the computing instance is in a state of executing (i.e., the start of booting the computing instance). In some examples, a time in which a customer receives a usable computing instance (e.g., a booted computing instance) may be included in a predicted launch time by including a boot time for the computing instance.

As in block 750, an additional physical host may be added to the group of physical hosts to decrease the predicted launch time. For example, one or more physical hosts may be added to a group of physical hosts to reduce the predicted launch time below that of a target launch time, an average launch time, a maximum launch time or any other launch time as determined by a computing service provider.

Figure 8:
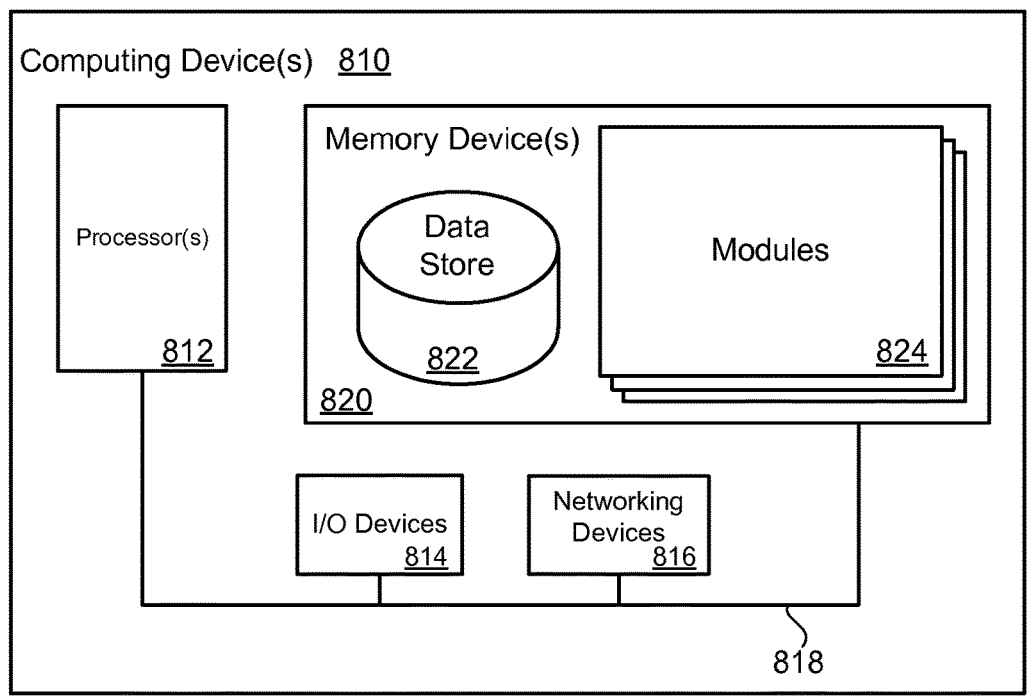
FIG. 8 is block diagram illustrating an example of a computing device that may be used to execute a method for determining computing capacity for a computing service.

FIG. 8 illustrates a computing device 810 on which modules of this technology may execute. A computing device 810 is illustrated on which a high level example of the technology may be executed. The computing device 810 may include one or more processors 812 that are in communication with a plurality of memory devices 820. The computing device 810 may include a local communication interface 818 for the components in the computing device. For example, the local communication interface 818 may be a local data bus and/or any related address or control busses as may be desired.

A memory device 820 may contain modules 824 that are executable by the processor(s) 812 and data for the modules 824. For example, a memory device 820 may contain a launch time prediction module, a launch feature module, a training module, a computing capacity module, a co-location module, as well as other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   determine a state of a computing service environment that includes a group of physical hosts configured to execute computing instances of a computing instance type;
   predict launch demand for computing instance launches of the computing instance type on the group of physical hosts;
   determine expected co-location of the computing instance launches on the group of physical hosts by applying the predicted launch demand for computing instance launches to the state of the computing service environment, wherein the expected co-location of the computing instance launches comprise simultaneous execution of launches of the computing instances on a single physical host;
   provide a feature representing the expected co-location of the computing instance launches to a machine learning model that outputs a predicted launch time for the computing instance launches;
   determine whether the predicted launch time satisfies a target launch time associated with the computing instance launches; and add an additional physical host located in the computing service environment to the group of physical hosts capable of executing computing instances of the computing instance type as a result of the predicted launch time not satisfying the target launch time.

2. A non-transitory machine readable storage medium as in claim 1, wherein instructions that when executed by the processor provide an added capacity feature to the machine learning model, the added capacity feature representing a number of physical hosts capable of executing computing instances of the computing instance type that are added to the group of physical hosts.

3. A non-transitory machine readable storage medium as in claim 1, wherein instructions that when executed by the processor determine a number of additional physical hosts that are added to the group of physical hosts, wherein the number of physical hosts are determined by:
adjusting a launch feature representing a number of physical hosts added to the group of physical hosts or removed from the group of physical hosts;
providing the launch feature to the machine learning model; and
determining an effect of the launch feature on the predicted launch time.

4. A computer implemented method, comprising:
under control of one or more computer systems configured with executable instructions, determining a state of a computing service environment having a group of physical hosts that execute computing instances, using one or more processors of the computer systems;
predicting demand for computing instance launches on the group of physical hosts, using one or more processors of the computer systems;
determining expected co-location of the computing instance launches on the group of physical hosts by applying the predicted demand for the computing instance launches to the state of the computing service environment, using one or more processors of the computer systems, wherein the expected co-location of the computing instance launches comprise simultaneous execution of launches of the computing instances on a single physical host;
determining a predicted launch time for the computing instance launches using the expected co-location of the computing instance launches, using one or more processors of the computer systems;
identifying at least one additional physical host located in the computing service environment to add to the group of physical hosts to decrease the predicted launch time, using one or more processors of the computer systems; and
causing the at least one additional physical host located in the computing service environment to be added to the group of physical hosts, using one or more processors of the computer systems.

5. A method as in claim 4, further comprising determining the predicted launch time using a machine learning model.

6. A method as in claim 4, further comprising providing features to a machine learning model that generate the predicted launch time, the features representing the state of the computing service environment, the predicted demand, the co-location of the computing instance launches and an added capacity variable representing a number of physical hosts that are added to the group of physical hosts.

7. A method as in claim 6, further comprising:
adjusting a value of the added capacity variable and holding other feature values constant;
providing the features to the machine learning model to obtain a new predicted launch time;
determining whether the new predicted launch time is an improved launch time compared to the predicted launch time; and
adding a number of additional physical hosts to the group of physical hosts equal to the added capacity variable.

8. A method as in claim 4, wherein determining a state of a computing service environment having physical hosts that execute computing instances further comprises, determining a state of a computing service environment having physical hosts that execute computing instances of a computing instance type.

9. A method as in claim 4, further comprising analyzing the computing service environment to identify additional physical hosts that are idle and that are capable of hosting computing instances that are of a computing instance type.

10. A method as in claim 9, further comprising determining computing capacity for various groups of physical hosts that host computing instances of different computing instance types when analyzing the computing service environment to identify additional physical hosts to host the computing instances of the computing instance type.

11. A method as in claim 4, wherein adding an additional physical host further comprises, reconfiguring the additional physical host to execute computing instances of the computing instance type.

12. A method as in claim 4, wherein determining the predicted demand for computing instance launches further comprises, determining the predicted demand for computing instance launches using historical data that represents computing instance launch patterns.

13. A method as in claim 4, wherein determining the predicted demand for computing instance launches further comprises, determining the predicted demand for computing instance launches using a launch demand heuristic.

14. A method as in claim 4, wherein the additional physical host is added to the computing service environment as a result of the predicted launch time being greater than an SLA (Service Level Agreement) launch time associated with the computing instance launches.

15. A method as in claim 4, wherein determining a state of a computing service environment further comprises, identifying a status of physical hosts that are included in the computing service environment and the status includes metrics associated with pending computing instances and running computing instances on a physical host, percentage of occupancy utilized on the physical host, an operating system, networking type and data store used by computing instances located on the physical host.

16. A method as in claim 5, further comprising:
obtaining training data representing the state of the computing service environment, the predicted demand and the co-location of the computing instance launches; and
inputting the training data into the machine learning model to train the machine learning model to predict a launch time.

17. A method as in claim 5, wherein determining the predicted launch time using a machine learning model further comprises, determining the predicted launch time using a machine learning model selected from one of: a random forest model, an extremely randomized trees model, an AdaBoost model, a stochastic gradient descent model or a support vector machine model.

18. A method as in claim 5, wherein determining the predicted launch time using a machine learning model further comprises, determining the predicted launch time using a machine learning regression model.

19. A system comprising:
- a processor;
- a memory device including instructions that, when executed by the processor, cause the system to:
- determine a state of a computing service environment that includes a group of physical hosts executing computing instances of a computing instance type;
- determine launch demand for computing instance launch plans of the computing instance type on the group of physical hosts;
- determine expected co-location of the computing instance launch plans on the group of physical hosts by applying the launch demand for the computing instance launch plans to the state of the computing service environment, wherein the expected co-location of the computing instance launch plans comprise simultaneous execution of launches of the computing instance plans on a single physical host;
- provide a co-location feature representing the expected co-location of the computing instance launch plans and an added capacity variable representing a number of physical hosts that are added to the group of physical hosts to a machine learning model that outputs a predicted launch time for the computing instance launch plans;
- determine whether the predicted launch time for the computing instance launch plans satisfy a target launch time associated with the computing instance launch plan; and
- add additional physical hosts located in the computing service environment that are equal to a value of the added capacity variable to the group of physical hosts resulting in a predicted launch time that satisfies the target launch time.

20. A system as in claim 19, wherein the memory device includes instructions that, when executed by the processor, cause the system to provide a planning recommendation for adding a number of physical hosts to the computing service environment.

* * * * *